E. ROCK.
Improvement in Hay and Cotton Presses.

No. 115,106. Patented May 23, 1871.

UNITED STATES PATENT OFFICE.

EUGENE ROCK, OF GREENVALE, NEW YORK.

IMPROVEMENT IN HAY AND COTTON PRESSES.

Specification forming part of Letters Patent No. 115,106, dated May 23, 1871.

*To all whom it may concern:*

Be it known that I, EUGENE ROCK, of Greenvale, in the county of Queens and State of New York, have invented a new and useful Improvement in Cotton and Hay Presses; and I do hereby declare that the following is a full, clear, and exact description thereof, which will enable others skilled in the art to make and use the same, reference being had to the accompanying drawing forming part of this specification.

My invention consists in a new way of combining mechanical parts to form an improved operative mechanism for actuating the follower of a hay or cotton press, as hereinafter fully described, and subsequently pointed out in the claim.

Figure 1:
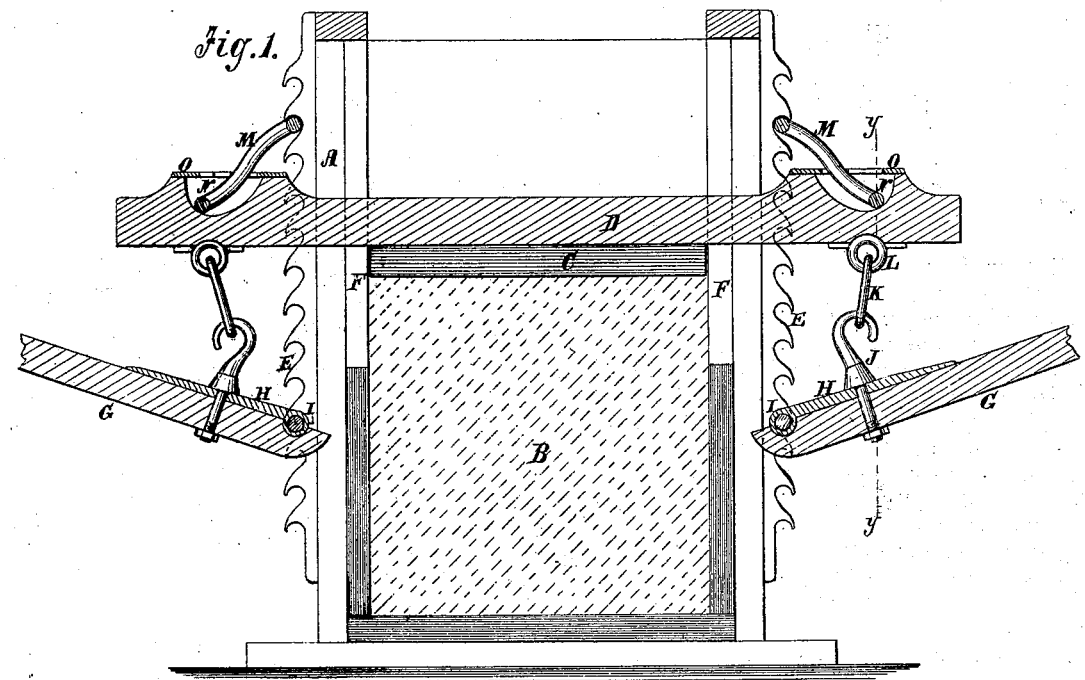
Figure 2:
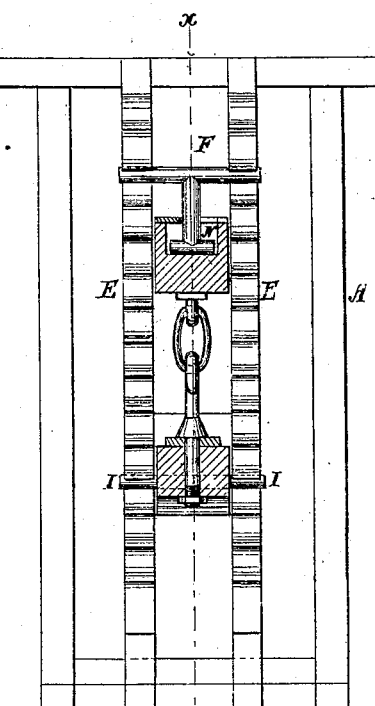

In the accompanying drawing, Figure 1 represents a vertical section through the press taken on the line $x\ x$ of Fig. 2. Fig. 2 is an end view of the press looking from the line $y\ y$ of Fig. 1.

Similar letters of reference indicate corresponding parts.

A is the frame. B, pressing-chamber. C is the follower. D is the follower-bar. E E are vertical ratchets on each end of the press. The press-box is slotted between the ratchets, as seen at F, to allow the follower-bar D to descend. G represents a lever at each end of the press, upon the top of the short end of which is a plate, H, having at its extreme end projecting gudgeons I I, which gudgeons engage with the ratchet-teeth. The lever is connected with the follower-bar by means of the hook J, link K, and eye L, the latter being firmly attached to the bar. M is a holding-pawl at each end of the bar, made in the form of a T, the top of which engages with the ratchet-teeth, as seen in Fig. 2.

It will be seen from this arrangement that when the levers are worked together down the ratchets the bar and follower will be drawn down onto the contents of the press with great force. What the levers gain is held by the pawls. The gudgeons I I form the fulcrum-pins of the levers, and it will be seen that a powerful purchase is obtained upon the follower-bar. The pawls M M are placed loosely in the recesses N N, through the plates O O, and drop by their own gravity, so as to engage with the teeth as they descend. When the cotton or contents of the press have been sufficiently condensed the pawls are removed and the levers are detached from the links, which allows the follower-bar to be drawn from the slot.

I do not confine myself to any particular style of press, but require the slots therein. My invention is in the mode of forcing down the follower.

Having thus described my invention, I claim as new and desire to secure by Letters Patent—

The arrangement of the T-shaped pawls M, the plates O, the double racks E E, follower D, and levers G G, in a cotton-press, substantially as shown, and for the purpose set forth.

The above specification of my invention signed by me this 25th day of February, 1871.

EUGENE ROCK.

Witnesses:
GEO. W. MABEE,
T. B. MOSHER.